(12) United States Patent
Sanji et al.

(10) Patent No.: US 10,157,542 B2
(45) Date of Patent: Dec. 18, 2018

(54) USER IDENTIFICATION SYSTEM AND VEHICULAR PORTABLE DEVICE

(71) Applicant: DENSO CORPORATION, Kariya, Aichi-pref. (JP)

(72) Inventors: Kenichiro Sanji, Kariya (JP); Noritaka Hirao, Kariya (JP); Suguru Matsushita, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/556,526

(22) PCT Filed: Mar. 10, 2016

(86) PCT No.: PCT/JP2016/001323
§ 371 (c)(1),
(2) Date: Sep. 7, 2017

(87) PCT Pub. No.: WO2016/152060
PCT Pub. Date: Sep. 29, 2016

(65) Prior Publication Data
US 2018/0053416 A1  Feb. 22, 2018

(30) Foreign Application Priority Data
Mar. 25, 2015 (JP) ................. 2015-063290

(51) Int. Cl.
*B60R 16/02* (2006.01)
*G08G 1/127* (2006.01)
(Continued)

(52) U.S. Cl.
CPC ............ *G08G 1/127* (2013.01); *B60R 16/02* (2013.01); *B60R 25/24* (2013.01); *B60R 25/245* (2013.01);
(Continued)

(58) Field of Classification Search
CPC ..................................................... G08G 1/127
(Continued)

(56) References Cited

U.S. PATENT DOCUMENTS

2004/0148091 A1* 7/2004 Masclet ............ G01C 21/3608
701/539
2010/0245125 A1* 9/2010 Wike, Jr. ................ G08G 1/042
340/928

(Continued)

FOREIGN PATENT DOCUMENTS

JP 2008114669 A 5/2008
JP 2010248709 A 11/2010
(Continued)

*Primary Examiner* — Qutbuddin Ghulamali
(74) *Attorney, Agent, or Firm* — Harness, Dickey & Pierce, P.L.C.

(57) ABSTRACT

A user identification system is provided. In the user identification system, an in-vehicle apparatus specifies a position of a vehicular portable device with reference to a vehicle and determines whether the vehicular portable device exists in a predetermined identification area. Based on determining that the vehicular portable device exists in the identification area, the in-vehicle apparatus transmits an instruction signal instructing the vehicular portable device to specify a driver terminal. Based on reception signal strength detected during a time period determined by a time point of receipt of the instruction signal, the vehicular portable device determines the driver terminal.

12 Claims, 7 Drawing Sheets

(51) Int. Cl.

| | |
|---|---|
| *B60R 25/24* | (2013.01) |
| *H04B 17/318* | (2015.01) |
| *G01S 3/16* | (2006.01) |
| *G06Q 50/30* | (2012.01) |
| *G08G 1/005* | (2006.01) |
| *G07C 5/00* | (2006.01) |
| *G07C 9/00* | (2006.01) |
| *H04W 4/02* | (2018.01) |
| *G06F 21/35* | (2013.01) |

(52) U.S. Cl.
CPC ............... *G01S 3/16* (2013.01); *G06F 21/35* (2013.01); *G06Q 50/30* (2013.01); *G07C 5/00* (2013.01); *G07C 9/00309* (2013.01); *G08G 1/005* (2013.01); *H04B 17/318* (2015.01); *H04W 4/02* (2013.01); *B60R 2325/103* (2013.01); *B60R 2325/205* (2013.01); *G07C 2009/00325* (2013.01); *G07C 2209/63* (2013.01)

(58) Field of Classification Search
USPC .......................................................... 340/989
See application file for complete search history.

(56) References Cited

U.S. PATENT DOCUMENTS

| | | | | |
|---|---|---|---|---|
| 2010/0265104 | A1* | 10/2010 | Zlojutro | G07C 5/008 |
| | | | | 340/990 |
| 2015/0050908 | A1* | 2/2015 | Basir | B60W 50/045 |
| | | | | 455/404.2 |
| 2015/0066607 | A1* | 3/2015 | Fiorucci | G06Q 30/0226 |
| | | | | 705/13 |

FOREIGN PATENT DOCUMENTS

| | | |
|---|---|---|
| JP | 2010283582 A | 12/2010 |
| JP | 2011026768 A | 2/2011 |
| JP | 2011076568 A | 4/2011 |
| JP | 2013110501 A | 6/2013 |
| WO | WO-2016152061 A1 | 9/2016 |

* cited by examiner

USER IDENTIFICATION SYSTEM AND VEHICULAR PORTABLE DEVICE

CROSS REFERENCE TO RELATED APPLICATIONS

This application is a U.S. National Phase Application under 35 U.S.C. 371 of International Application No. PCT/JP2016/001323 filed on Mar. 10, 2016 and published in Japanese as WO 2016/152060 A1 on Sep. 29, 2016. This application is based on and claims the benefit of priority from Japanese Patent Application No. 2015-063290 filed on Mar. 25, 2015. The entire disclosures of all of the above applications are incorporated herein by reference.

TECHNICAL FIELD

The present disclosure relates to a user identification system and a vehicular portable device for identifying a user who undertakes a role as a driver.

BACKGROUND ART

Conventionally, there is known a system to perform various controls such as locking and unlocking a door or starting an engine of a vehicle based on that wireless communication successfully verifies an in-vehicle apparatus mounted to the vehicle and a vehicular portable device that is carried by a user and is associated with the in-vehicle apparatus.

Patent Literature 1 discloses a system (hereinafter referred to as a user identification system) that uses the above-mentioned system to identify a user going to get into a vehicle and thereby automatically changes settings including an interior environment such as a seat position to a predetermined user-specific interior environment.

The user identification system disclosed in Patent Literature 1 allows a user's mobile terminal (such as a mobile phone) to previously register user information used as an indicator to specify a user. Suppose the user enters a wireless communication area for the in-vehicle apparatus while carrying both the vehicular portable device and the mobile terminal. In this case, the vehicular portable device uses intra-body communication to acquire the user information from the mobile terminal and transmits the acquired user information to the in-vehicle apparatus. The in-vehicle apparatus specifies the user based on the user information received from the vehicular portable device and changes the interior environment setting to the one suited for the user preference.

As a modification, Patent Literature 1 discloses that a manner of communication between the vehicular portable device and the mobile terminal may be near field communication whose communicable distance approximates several centimeters. Anyway, the supposed manner uses only one mobile phone existing at a position capable of communication with the vehicular portable device.

PRIOR ART LITERATURES

Patent Literature

Patent Literature 1: JP 2011-26768 A

SUMMARY OF INVENTION

In the configuration disclosed in Patent Literature 1, setting of the interior environment can be automatically changed to the one suited for the user preference when the user enters a wireless communication area for the in-vehicle apparatus while carrying both the vehicular portable device and the mobile terminal.

However, the mobile terminal and the vehicular portable device are not always carried in a manner that enables the intra-body communication. Suppose one of the mobile terminal and the vehicular portable device is placed in a bag and the user wears the other. This disables communication even if communication between the mobile terminal and the vehicular portable device is made with the near field communication whose communicable distance approximates several centimeters.

For addressing this issue, there may be a configuration (referred to as a first supposed configuration) in which the vehicular portable device and the mobile terminal communicate with each other by using the short range communication that features the maximum communication range of tens of meters to prove a relatively wider communication range than the intra-body communication or the near field communication. However, the vehicular portable device is expected to detect not only the mobile terminal carried by the driver, but also a mobile terminal carried by a user other than the driver when the short range communication is used in the communication between the vehicular portable device and the mobile terminal. In such a case, the vehicular portable device cannot determine which mobile terminal the driver carries.

There may be a second supposed configuration which determines that a mobile terminal transmitting a signal indicating the greatest reception signal strength is a mobile terminal carried by the driver when multiple mobile terminals are detected. The reason follows. The vehicular portable device is positioned relatively near to the mobile terminal carried by the driver. A vehicular mobile terminal is expected to detect greater reception signal strength of a signal transmitted from the mobile terminal carried by the driver than of a signal transmitted from a mobile terminal carried by a user other than the driver.

However, in the vehicular portable device, the reception signal strength of a signal transmitted from the mobile terminal may be affected by not only a distance but also various factors such as reflection or attenuation of a radio wave due to a human body or a surrounding environment. Therefore, a mobile terminal to transmit a signal indicating the greatest reception signal strength does not always conform to a mobile terminal carried by the driver.

The second supposed configuration is likely to incorrectly identify a mobile terminal carried by a user other than the driver as a mobile terminal carried by the driver. The in-vehicle apparatus recognizes a user, not actually the driver, as the driver when the mobile terminal carried by the driver is incorrectly identified.

In consideration of the foregoing, it is an object of the present disclosure to provide a user identification system and a vehicular portable device capable of accurately specifying a driver even when multiple mobile terminals exist around the vehicular portable device.

A user identification system in an example of the present disclosure comprises: an in-vehicle apparatus mounted to a vehicle used by a plurality of users; and a vehicular portable device that is carried by, of the plurality of users, a person who undertakes a role as a driver, and that is associated with the in-vehicle apparatus. The in-vehicle apparatus includes: an in-vehicle apparatus communicator that communicates with the vehicular portable device; and a portable device position specification section that specifies a position of the vehicular portable device with reference to the vehicle and determines whether the vehicular portable device exists in a predetermined identification area. The vehicular portable device includes: a first communicator that communicates with the in-vehicle apparatus; a second communicator that performs short range communication with a mobile terminal carried by the user; a reception signal strength detector that detects reception signal strength of a signal that the second communicator receives from the mobile terminal; and a driver terminal determination section that determines a driver terminal based on the reception signal strength detected by the reception signal strength detector, the driver terminal being the mobile terminal carried by the user undertaking the role as the driver. The in-vehicle apparatus communicator transmits an instruction signal to the vehicular portable device as an instruction to perform a process to determine the driver terminal based on determining, by the portable device position specification section, that the vehicular portable device exists in the identification area. The first communicator receives the instruction signal transmitted from the in-vehicle apparatus. The driver terminal determination section determines the driver terminal, based on the reception signal strength detected by the reception signal strength detector during a time period determined by a reference time point, the reference time point being a time point when the first communicator receives the instruction signal. The identification area is an area in which there is a high possibility for the vehicular portable device that the reception signal strength of the signal transmitted from the mobile terminal carried by the user undertaking the role as the driver is greater than the reception signal strength of the signal transmitted from the mobile terminal carried by the user other than the driver.

With the above-mentioned configuration, the in-vehicle apparatus transmits an instruction signal to the vehicular portable device as an instruction to specify the driver terminal based on that the portable device position specification section determines existence of the vehicular portable device in a predetermined identification area.

The vehicular portable device receives the instruction signal from the in-vehicle apparatus and then determines the driver terminal during a time period determined by the time of the reception as a reference time point, based on reception signal strength of a signal transmitted from the mobile terminal while the reception signal strength detector detects the reception signal strength.

The reception signal strength used to determine the driver terminal is acquired during a time period determined by the reference time point being a time point of the receipt of the instruction signal from the in-vehicle apparatus. The in-vehicle apparatus transmits the instruction signal when the vehicular portable device exists in a predetermined identification area. Namely, the reception signal strength used to determine the driver terminal is acquired when the vehicular portable device exists in a predetermined identification area.

The identification area used in the above-mentioned configuration causes the reception signal strength from the mobile terminal carried by the driver more likely to be greater than the reception signal strength from the mobile terminal carried by a user other than the driver.

The mobile terminal indicating the greatest reception signal strength is therefore highly likely the driver terminal in a situation where the vehicular portable device exists in the identification area. Namely, the above-mentioned configuration can therefore inhibit a possibility of incorrectly identifying the mobile terminal carried by a user other than the driver as the mobile terminal carried by the driver. The configuration can more accurately specify the mobile terminal carried by the driver even when multiple mobile terminals exist around the vehicular portable device. The driver can therefore be more accurately specified.

A vehicular portable device in an example of the present disclosure is associated with an in-vehicle apparatus mounted to a vehicle used by a plurality of users and comprises: a first communicator that communicates with the in-vehicle apparatus; a second communicator that performs short range communication with a mobile terminal carried by the user; a reception signal strength detector that detects reception signal strength of a signal the second communicator receives from the mobile terminal; and a driver terminal determination section that determines a driver terminal based on the reception signal strength detected by the reception signal strength detector, the driver terminal being the mobile terminal carried by the user undertaking a role as a driver. The first communicator receives an instruction signal that is transmitted from the in-vehicle apparatus as an instruction to perform a process to determine the driver terminal when the vehicular portable device exists in a predetermined identification area. The driver terminal determination section determines the driver terminal based on the reception signal strength detected by the reception signal strength detector during a time period determined by a reference time point, the reference time point being a time point when the first communicator receives the instruction signal. The identification area is an area in which there is a high possibility for the vehicular portable device that the reception signal strength of the signal transmitted from the mobile terminal carried by the user undertaking the role as the driver is greater than the reception signal strength of the signal transmitted from the mobile terminal carried by the user other than the driver.

This vehicular portable device corresponds to the vehicular portable device used for the above-mentioned user identification system. The above-mentioned configuration therefore provides an effect similar to the above-mentioned user identification system.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
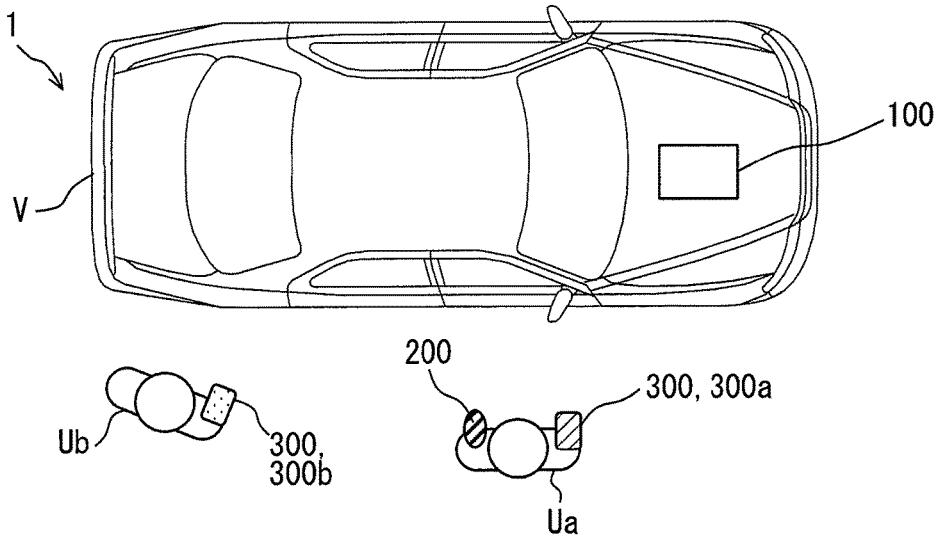
FIG. 1 is a conceptual diagram illustrating an embodiment of a user identification system.

Embodiments will be described with reference to the accompanying drawings. FIG. 1 is a conceptual diagram illustrating one embodiment of a user identification system 1. As illustrated in FIG. 1, the user identification system 1 includes an in-vehicle apparatus 100, a vehicular portable device 200, and multiple mobile terminals 300a and 300b. The in-vehicle apparatus 100 is mounted to vehicle V. The vehicular portable device 200 has a function as a unique key for vehicle V. The mobile terminals 300a and 300b are carried by multiple users Ua and Ub, respectively.

The user is assumed to be a previously registered user of vehicle V. The vehicular portable device 200 is assumed to be carried by user Ua. The description below uses mobile terminal 300 when there is no need for distinction between the mobile terminal 300a and the mobile terminal 300b.

<Overall Schematic Configuration>

The in-vehicle apparatus 100 and the vehicular portable device 200 perform wireless communication with each other by using radio waves of a predetermined frequency band and thereby provide a function to implement a publicly known smart entry system.

Specifically, the vehicular portable device 200 has a function to receive a signal of a predetermined frequency band transmitted from the in-vehicle apparatus 100 and return a signal of a predetermined frequency band to the in-vehicle apparatus 100. The in-vehicle apparatus 100 transmits a signal of a predetermined frequency band to the vehicular portable device 200 and receives a signal of a predetermined frequency band transmitted from the vehicular portable device 200.

By way of example, the in-vehicle apparatus 100 uses an LF (Low Frequency) band radio wave to transmit signals to the vehicular portable device 200. The vehicular portable device 200 uses a UHF (Ultra High Frequency) band radio wave to transmit signals to the in-vehicle apparatus 100. For example, the LF band ranges from 30 kHz to 300 kHz and the UHF band ranges from 300 MHz to 3 GHz.

The in-vehicle apparatus 100 performs a verification process by wirelessly communicating with the vehicular portable device 200 and performs various controls to lock and unlock a door and start an engine based on a successful verification. User Ua carrying the vehicular portable device 200 can thereby lock and unlock doors or start and stop the engine without manipulating the vehicular portable device 200 serving as a key.

A communication range (referred to as a vehicle communication range) for the in-vehicle apparatus 100 may be appropriately designed so as to be able to detect the vehicular portable device 200 even when user Ua approaches vehicle V in any orientations. For example, the vehicle communication range is assumed to cover several meters from vehicle V.

The vehicular portable device 200 includes a switch 240 (see FIG. 5) manipulated by a user. The vehicular portable device 200 transmits a signal corresponding to a switch manipulated by the user to the in-vehicle apparatus 100 to provide so-called a remote keyless entry function, which controls to lock or unlock a vehicle door. The vehicular portable device 200 functions as a key for vehicle V.

The mobile terminal 300 is provided as a communication device having a function to perform communication (referred to as short-range communication) that covers a maximum communication range of several tens of meters and is compliant with a specified short range communication standard. The mobile terminal 300 just needs to have the short-range communication function. A mobile phone such as a smartphone can be used as the mobile terminal 300. The mobile terminal 300 may be also provided as a tablet computer, a wearable device, a portable device music player, and a portable device video game machine.

The short range communication standard may conform to Bluetooth Low Energy (Bluetooth is registered trademark), Wi-Fi (registered trademark), and ZigBee (registered trademark).

The vehicular portable device 200 also has the above-mentioned short-range communication function. The vehicular portable device 200 detects the mobile terminal 300 existing within a range (referred to as a short-range communication range) of the short-range communication for the self unit and performs the short-range communication. The self unit here signifies the vehicular portable device 200. The mobile terminal 300 notifies its existence to the vehicular portable device 200 by transmitting a notification signal periodically or based on a request from the vehicular portable device 200. The notification signal includes a unique identification code (hereinafter referred to as a terminal ID) allocated to the mobile terminal 300 itself.

In the example here, the vehicular portable device 200 behaves as a master for the mobile terminal 300 and the mobile terminal 300 behaves as a slave for the vehicular portable device 200. The mobile terminal 300 notifies its existence to the vehicular portable device 200 by periodically transmitting a notification signal at a predetermined cycle (referred to as a notification cycle).

The mobile terminals 300a and 300b in FIG. 1 are assumed to exist in the short-range communication range for the vehicular portable device 200. Obviously, the number of mobile terminals 300 is not limited to 2 when the mobile terminals 300 can exist in the short-range communication range for the vehicular portable device 200.

<Outline of operation of the user identification system 1>The outline of the operation of The user identification system 1 according to the present embodiment is as follows. The vehicular portable device 200 specifies a mobile terminal (referred to as a driver terminal) carried by a user undertaking a role as a driver based on the reception signal strength of a signal received from the mobile terminal 300 existing in the vicinity of the self unit. The vicinity of the self unit signifies the inside of the short-range communication range.

The vehicular portable device 200 transmits driver information to the in-vehicle apparatus 100. The driver information is found from the terminal ID of the mobile terminal 300 specified as a driver terminal. The in-vehicle apparatus 100 uses the driver information to specify or recognize who undertakes a role as a driver for the current travel among the users of vehicle V. As an example here, the vehicular portable device 200 transmits the driver information, namely, the terminal ID of the mobile terminal 300 specified as the driver terminal, to the in-vehicle apparatus 100.

The in-vehicle apparatus 100 previously stores user management data that associates the user of vehicle V, the terminal ID of the mobile terminal 300 owned by the user, and vehicle setup data indicating user-specific settings (such as a seat position) for vehicle V with each other. The user of vehicle V can be identified by a user ID uniquely assigned to each user.

The in-vehicle apparatus 100 acquires the driver information from the vehicular portable device 200, references the user management data, and recognizes a driver, namely, a user corresponding to the terminal ID included in the acquired driver information.

The in-vehicle apparatus 100 references the vehicle setup data corresponding to the driver and automatically changes the setting including the interior environment such as a seat position to an interior environment corresponding to the driver preference. The driver information corresponds to an example of driver-terminal-related information. The description below explains specific configurations and operations of the components.

<Configuration of the In-Vehicle Apparatus 100>

Figure 2:
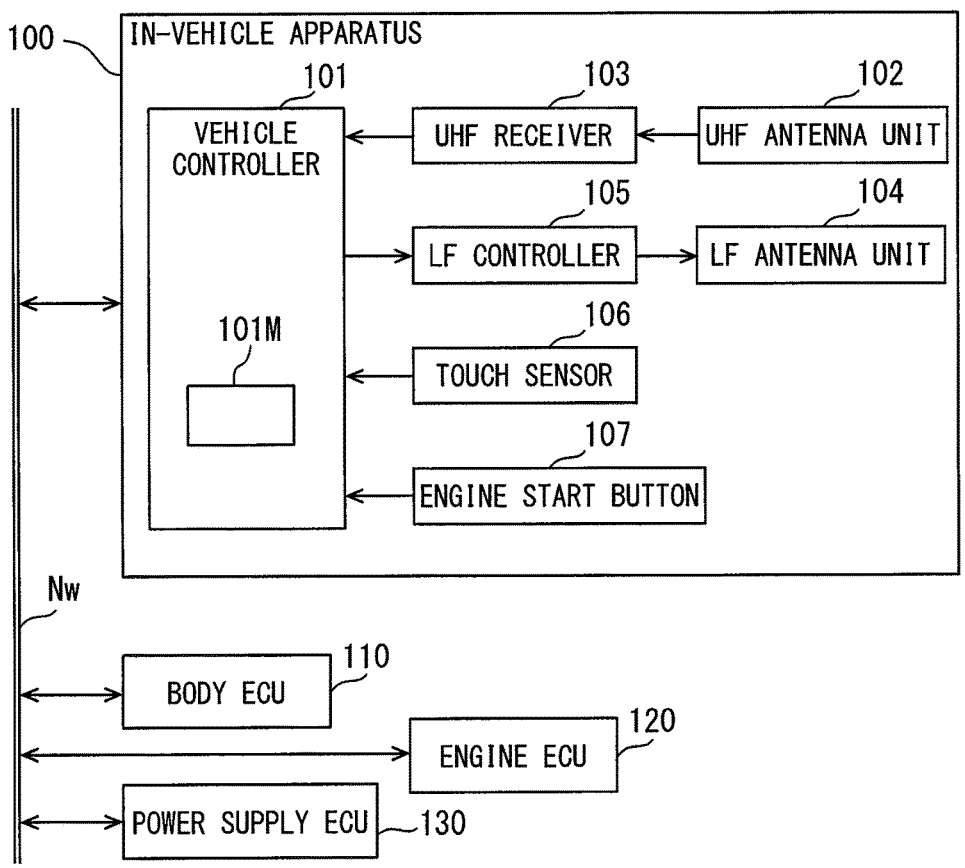
FIG. 2 is a block diagram illustrating a schematic configuration of an in-vehicle apparatus.

The in-vehicle apparatus 100 is mounted to vehicle V and connects with various ECUs (Electronic Control Units) so as to be capable of intercommunication via intra-vehicle network Nw as illustrated in FIG. 2. For example, the in-vehicle apparatus 100 communicates with a body ECU 110, an engine ECU 120, and a power supply ECU 130 via intra-vehicle network Nw.

The body ECU 110 controls various actuators (not shown) mounted to vehicle V. For example, the body ECU 110 locks or unlocks doors by outputting a drive signal to a door lock motor provided for each of vehicle doors. The drive signal controls to lock and unlock the doors provided for vehicle V. The body ECU 110 connects with a courtesy switch for each door to detect opening and closing of each door. The body ECU 110 also connects with an occupant detection sensor to detect whether an occupant exists on a driver's seat. An example of the occupant detection sensor can use a publicly known seat sensor provided for the driver's seat.

The engine ECU 120 controls operation of the engine. For example, the engine ECU 120 acquires a signal (referred to as an engine start permission signal) that permits the engine to start. The signal is received from the in-vehicle apparatus 100. The internal state then changes to an engine start wait state that can start a starter motor. The engine ECU 120 starts the engine upon acquiring a start instruction signal in the engine start wait state. The start instruction signal is received from the in-vehicle apparatus 100 and directs the engine to start.

The power supply ECU 130 controls electric power supply to various types of interior electric equipment. The power supply ECU 130 supplies the electric power to various types of interior electric equipment upon acquiring a signal that permits electric power supply to various types of interior electric equipment, for example. The signal is received from the in-vehicle apparatus 100.

The in-vehicle apparatus 100 includes a vehicle controller 101, a UHF antenna unit 102, a UHF receiver 103, an LF antenna unit 104, an LF controller 105, a touch sensor 106, and an engine start button 107. The UHF receiver 103 and the LF controller 105 correspond to an in-vehicle apparatus communicator. The vehicle controller 101 communicably connects with the UHF receiver 103, the LF controller 105, the touch sensor 106, and the engine start button 107.

The UHF antenna unit 102 converts a UHF-band radio wave into an electric signal and outputs the signal to the UHF receiver 103. The UHF antenna unit 102 may be provided at an appropriately designed position of vehicle V. The UHF receiver 103 demodulates a signal supplied from the UHF antenna unit 102 and supplies the signal to the vehicle controller 101.

The LF antenna unit 104 converts a signal, which is input from the LF controller 105, into an LF-band radio wave and radiates the radio wave to the space. The LF antenna unit 104 includes at least an LF antenna that converts a signal, which is input from the LF controller 105, into an LF-band radio wave and radiates to the space. The LF antenna unit 104 may include an amplifier to amplify a signal input from the LF controller 105 in addition to the LF antenna.

Figure 3:
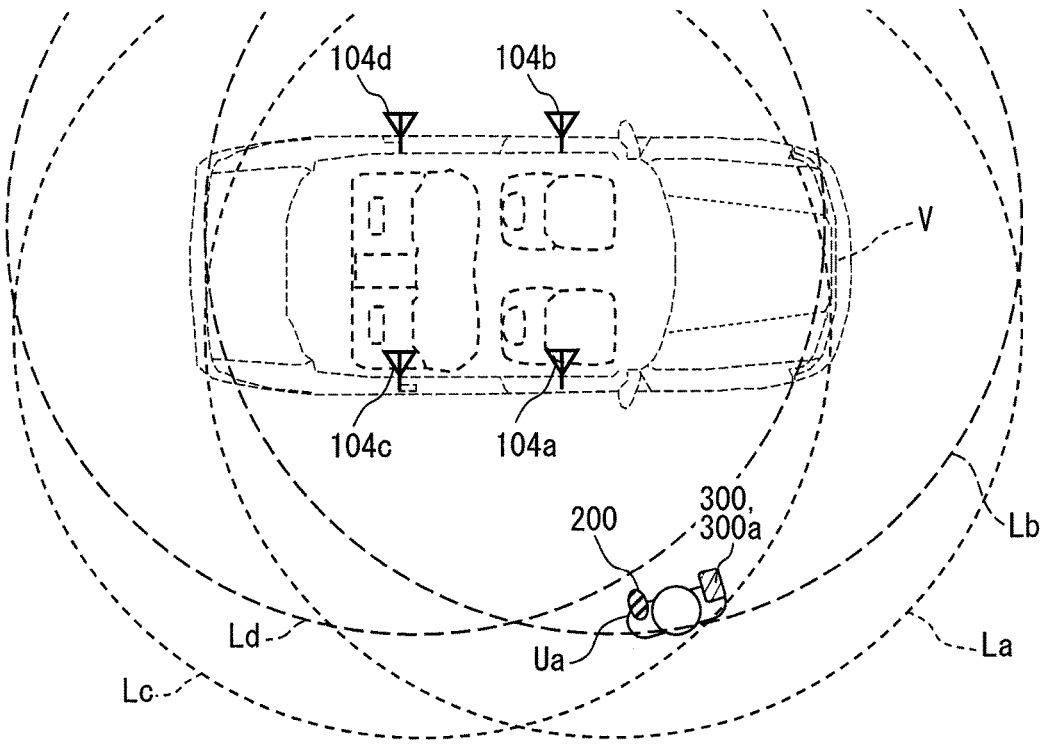
FIG. 3 is a conceptual diagram illustrating a communication range formed by each LF antenna unit.

The LF antenna unit 104 is provided at multiple locations of vehicle V. As illustrated in FIG. 3, the LF antenna unit 104 is assumed to be provided near a door handle of each door of vehicle V. Namely, the in-vehicle apparatus 100 includes an LF antenna unit 104a, an LF antenna unit 104b, an LF antenna unit 104c, and an LF antenna unit 104d. The LF antenna unit 104a is provided for a door handle at a driver's seat. The LF antenna unit 104b is provided for a door handle at a passenger seat. The LF antenna unit 104c is provided for a door handle at a rear seat corresponding to the driver's seat. The LF antenna unit 104d is provided for a door handle at a rear seat corresponding to the passenger seat.

Obviously, positions to mount the LF antenna units 104 are not limited to the above. The LF antenna unit 104 may be also provided near a trunk lid or a predetermined interior position as well as the above-mentioned places. In the present embodiment, the driver's seat of vehicle V is assumed to be a right front seat.

A radio wave transmitted from each LF antenna unit 104 reaches an area (referred to as a reachable area) that is determined so as to form an intended vehicle communication range. A radio wave transmitted from each LF antenna unit 104 is assumed to reach a distance of several to ten meters. Most part of the reachable area is designed to overlap with a reachable area of the other LF antenna unit 104. In FIG. 3, an area enclosed in broken line La conceptually illustrates the reachable area for a radio wave transmitted from the LF antenna unit 104a. An area enclosed in broken line Lb conceptually illustrates the reachable area for a radio wave transmitted from the LF antenna unit 104b. An area enclosed in broken line Lc conceptually illustrates the reachable area for a radio wave transmitted from the LF antenna unit 104c. An area enclosed in broken line Ld conceptually illustrates the reachable area for a radio wave transmitted from the LF antenna unit 104d.

The LF controller 105 generates a signal by modulating a baseband signal input from the vehicle controller 101 to a carrier signal. The LF controller 105 sequentially outputs the modulated signal to each LF antenna unit 104 and sequentially causes each LF antenna unit 104 to transmit the signal. The vehicle controller 101 controls the time to transmit a radio wave from each LF antenna unit 104 in order to prevent an overlap between times to transmit radio waves from the multiple LF antenna units 104. Shifting times to transmit radio waves from the LF antenna units 104 can prevent a signal transmitted from one LF antenna unit 104 from interfering with a signal transmitted from another LF antenna unit 104.

The touch sensor 106 is attached to each door handle of vehicle V and detects that a user touches the door handle. Detection results from each of the touch sensors 106 are sequentially output to the vehicle controller 101.

The engine start button 107 is provided as a push switch that allows the user to start the engine. The engine start button 107, when pushed by the user, outputs a control signal indicating this push manipulation to the vehicle controller 101.

The vehicle controller 101 is mainly configured as a microcomputer including a CPU, ROM, flash memory, RAM, and an I/O unit and performs various processes by executing a control program stored in the ROM. The vehicle controller 101 performs a process to implement the smart entry system, for example.

A storage unit 101M included in the vehicle controller 101 is provided as a non-volatile recording medium such as flash memory. The storage unit 101M stores user management data that associates a user of vehicle V, a terminal ID of the mobile terminal 300 owned by the user, and vehicle setup data indicating the user-specific setting for vehicle V with each other.

The user-specific setting includes items configuring the interior environment such as a seat position, angles of an interior mirror and a side mirror, and an air conditioner's temperature. Vehicle V may include a welcome illumination feature, namely, a feature that activates illuminations provided inside and outside a vehicle compartment in response to detection of driver's entrance or preparatory operation for the entrance. In such a case, an illumination color may be included as a user-specifiable item. An in-vehicle navigation system may also use different settings depending on users.

The storage unit 101M stores data indicating positions where the LF antenna units 104 are mounted to vehicle V.

Figure 4:
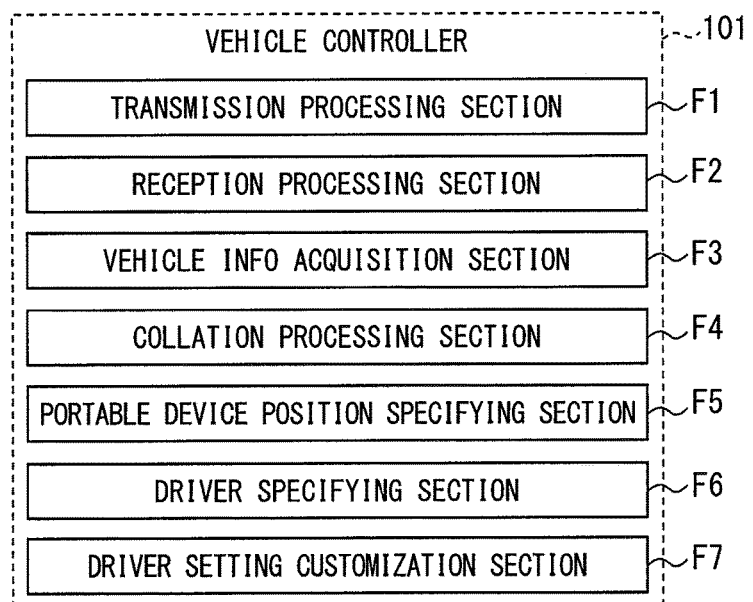
FIG. 4 is a block diagram illustrating a schematic configuration of a vehicle controller.

The vehicle controller 101 executes the above-mentioned program to implement function blocks such as a transmission processing section F1, a reception processing section F2, a vehicle information acquisition section F3, a verification processing section F4, a portable device position specification section F5, a driver specification section F6, and a driver setting customization section F7 as illustrated in FIG. 4. All or part of the functions performed by the vehicle controller 101 may be implemented as hardware by using one or more IC modules.

The transmission processing section F1 generates a signal to be transmitted from each LF antenna unit 104 and outputs the signal to the LF controller 105 so that the signal is sequentially transmitted from each LF antenna unit 104. Signals to be transmitted include a wake signal to transition the vehicular portable device 200 from sleep mode to wake mode to be described later, a verification signal to verify the vehicular portable device 200, a positioning signal to specify a position of the vehicular portable device 200 in relation to vehicle V, and an instruction signal to instruct specifying a driver terminal. These signals all request the vehicular portable device 200 to return a response signal corresponding to the signal content. The positioning signal may equal the wake signal.

The reception processing section F2 acquires data that is received by the UHF antenna unit 102 and is demodulated by the UHF receiver 103. The vehicle information acquisition section F3 acquires various types of information (vehicle information) indicating vehicle states from sensors and ECUs mounted to vehicle V such as the touch sensor 106, the engine start button 107, the body ECU 110, the engine ECU 120, and the power supply ECU 130.

The vehicle information includes opening and closing a door, locking or unlocking each door, a detection result from the occupant detection sensor, and the presence or absence of press on the touch sensor 106 and the engine start button 107. The vehicle information also includes a shift position detected by an unshown shift position sensor and a detection result from a brake sensor that detects whether a brake pedal is operated.

The verification processing section F4 performs a verification process along with the vehicular portable device 200 by using wireless communication. Procedures of the verification process are already known and a detailed description is omitted for simplicity. The verification processing section F4 performs the verification process based on the vehicle information acquired by the vehicle information acquisition section F3, upon detecting a predetermined user behavior that necessitates the verification process. The verification processing section F4 performs the verification process when the vehicular portable device 200 is detected to enter the vehicle communication range or the engine start button 107 is pushed, for example.

Whether the vehicular portable device 200 enters the vehicle communication range can be determined based on the presence or absence of a response from the vehicular portable device 200 in response to a periodically transmitted wake signal. Namely, the vehicular portable device 200 can be determined to enter the vehicle communication range when a response signal is received from the vehicular portable device 200 while no response signal is continuously received from the vehicular portable device 200 in response to the wake signal.

The portable device position specification section F5 specifies a position (referred to as a portable device position) of the vehicular portable device 200 in relation to vehicle V. Publicly known various methods can be used as methods to specify the portable device position.

By way of example, the vehicular portable device 200 receives a positioning signal, if any, and then returns a response signal including information (referred to as reception strength information) indicating the reception signal strength of the positioning signal. The portable device position specification section F5 specifies the portable device position based on the reception strength information included in the response signal.

A specific description follows. As illustrated in FIG. 3, suppose the vehicular portable device 200 is positioned to receive radio waves from the LF antenna units 104a, 104b, and 104c. The vehicular portable device 200 then returns a response signal including the reception strength information to each of positioning signals transmitted from the LF antenna units 104a, 104b, and 104c at different times. The vehicle controller 101 thereby acquires reception signal strengths of the positioning signals that are transmitted from the LF antenna units 104a, 104b, and 104c and are received by the vehicular portable device 200.

A wireless signal attenuates as it propagates through the space. Increasing a distance between the vehicular portable device 200 and the LF antenna unit 104 decreases the reception signal strength. The reception strength information included in the response signal returned in response to the positioning signal can be therefore used to find the distance between the vehicular portable device 200 and the LF antenna unit 104 that transmitted the positioning signal.

For example, distance conversion data represents correspondence relation between the reception signal strength and a distance between the LF antenna unit 104 and the vehicular portable device 200. Based on the distance conversion data, the portable device position specification section F5 specifies a distance between the vehicular portable device 200 and the LF antenna unit 104 having transmitted the positioning signal from the reception signal strength of the positioning signal. The distance conversion data can be generated from various tests and can be previously stored in the storage unit 101M.

The multiple LF antenna units 104 transmit positioning signals at different times. The portable device position specification section F5 can therefore uniquely specify the LF antenna unit 104 having transmitted the positioning signal based on the time to receive a response to the positioning signal. The storage unit 101M stores installation positions of the LF antenna units 104 in vehicle V.

Suppose the portable device position specification section F5 can successfully receive the signals responding to the positioning signals transmitted from at least three LF antenna units 104. The portable device position specification section F5 can then specify the position of the vehicular portable device 200 with reference to vehicle V according to the triangulation principle. Namely, the portable device position specification section F5 specifies the portable device position from the installation positions of the LF antenna units 104 in vehicle V and the distances from at least three LF antenna units 104.

The portable device position specification section F5 determines whether the portable device position is located in a predetermined identification area. The identification area is expected to cause, in the vehicular portable device 200, the reception signal strength of a short-range communication transmitted from the mobile terminal 300 carried by the driver to be greater than the reception signal strength of a short-range communication transmitted from a mobile terminal carried by another user. The identification area can be located near the door for the driver's seat or at the driver's seat. The identification area will be described in detail later.

The driver specification section F6 acquires the driver information transmitted from the vehicular portable device 200 to specify the driver. Namely, a user corresponding to the terminal ID indicated in the driver information is recognized as the driver.

The driver setting customization section F7 changes (or customizes) the setting including the vehicle environment to an environment suited for the driver preference. For example, the driver setting customization section F7 outputs a signal to the body ECU 110 so that the signal instructs moving the seat position of the driver's seat to a predetermined position. The body ECU 110 drives an actuator to adjust the seat position based on the instruction from the driver setting customization section F7.

<Configuration of the Vehicular Portable Device 200>

Figure 5:
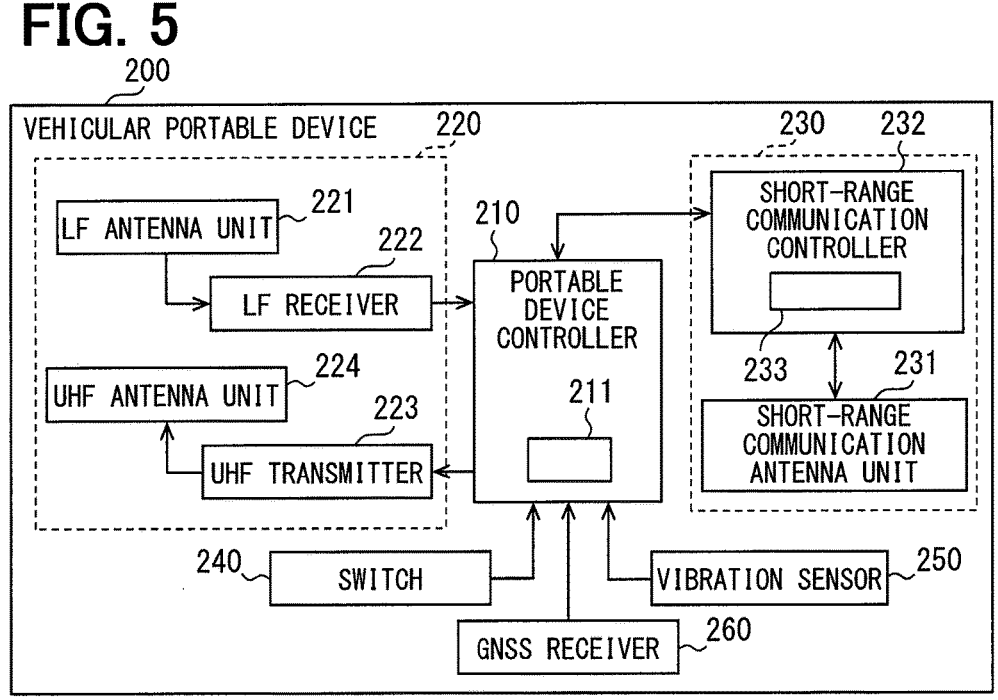
FIG. 5 is a block diagram illustrating a vehicular portable device.

As illustrated in FIG. 5, the vehicular portable device 200 includes a portable device controller 210, a vehicle communicator 220, a short-range communicator 230, a switch 240, a vibration sensor 250, and a GNSS receiver 260.

The portable device controller 210 controls operation of the vehicular portable device 200. The portable device controller 210 communicably connects with each of the vehicle communicator 220, the short-range communicator 230, the switch 240, the vibration sensor 250, and the GNSS receiver 260.

The vehicle communicator 220 is provided as a module that communicates with the in-vehicle apparatus 100. The vehicle communicator 220 further includes components such as an LF antenna unit 221, an LF receiver 222, a UHF transmitter 223, and a UHF antenna unit 224. The vehicle communicator 220 corresponds to a first communicator.

The LF antenna unit 221 converts an LF-band radio wave into an electric signal and outputs the signal to the LF receiver 222. The LF receiver 222 generates data by demodulating the signal input from the LF antenna unit 221. The LF receiver 222 includes a signal strength detection circuit that detects the reception signal strength of a signal received by the LF antenna unit 221. The LF receiver 222 supplies the data generated by demodulating the received signal and the reception signal strength associated with each other to the portable device controller 210.

The UHF transmitter 223 modulates a baseband signal input from the portable device controller 210 to a carrier signal and outputs the carrier signal to the UHF antenna unit 224. The UHF antenna unit 224 is provided as a module that converts the signal input from the UHF transmitter 223 into a UHF-band radio wave and radiates the radio wave to the space. The UHF antenna unit 224 includes at least a UHF antenna to radiate UHF-band radio waves.

The short-range communicator 230 is provided as a module that performs short-range communication with the mobile terminal 300. The short-range communicator 230 further includes components such as a short-range communication antenna unit 231 and a short-range communication controller 232. The short-range communicator 230 corresponds to a second communicator.

The short-range communication antenna unit 231 provides an antenna that transmits and receives radio waves of a frequency band (such as a 2.4 GHz band) used for the short-range communication. The short-range communication controller 232 demodulates a signal received by the short-range communication antenna unit 231 and supplies the signal to the portable device controller 210. The short-range communication controller 232 also modulates a signal input from the portable device controller 210 and outputs the signal to the short-range communication antenna unit 231 so that the signal is transmitted from the short-range communication antenna unit 231.

The short-range communication controller 232 further includes a reception signal strength detector 233 that detects the reception signal strength of a signal received by the short-range communication antenna unit 231. The short-range communication controller 232 supplies the data generated by demodulating the received signal and the reception signal strength associated with each other to the portable device controller 210.

The switch 240 accepts user manipulation on the vehicular portable device 200 and is provided as a push switch, for example. The user manipulates (or pushes) the switch 240 to make the remote keyless entry function usable for locking or unlocking a door of vehicle V, for example. Multiple switches 240 may be provided. The example here includes three switches 240, namely, the switch 240 to lock the door of vehicle V, the switch 240 to unlock the door of vehicle V, and the switch 240 to issue an instruction to determine the driver terminal.

The vibration sensor 250 detects a vibration occurring on the vehicular portable device 200 and can be embodied by using a publicly known acceleration sensor. The vibration sensor 250 outputs, to the portable device controller 210, a signal corresponding to the magnitude of the vibration occurring on the vehicular portable device 200.

The GNSS receiver 260 receives a radio wave from a satellite (referred to as a GNSS satellite) used for GNSS (Global Navigation Satellite System) to acquire information (current position information) indicating a current position of the GNSS receiver 260. The current position may be represented in latitude and longitude. The current position information acquired by the GNSS receiver 260 is output to the portable device controller 210. The GNSS satellite corresponds to a positioning satellite.

The portable device controller 210 is mainly configured as a microcomputer including a CPU, ROM, flash memory, RAM, and an I/O unit and performs various processes by executing a control program stored in the ROM. All or part of the functions performed by the vehicular portable device 200 may be implemented as hardware by using one or more IC modules.

A portable device storage unit 211 included in the portable device controller 210 is provided as a non-volatile storage medium such as flash memory. The portable device storage unit 211 stores a portable device ID allocated to the vehicular portable device 200 for verification with vehicle V.

Figure 6:
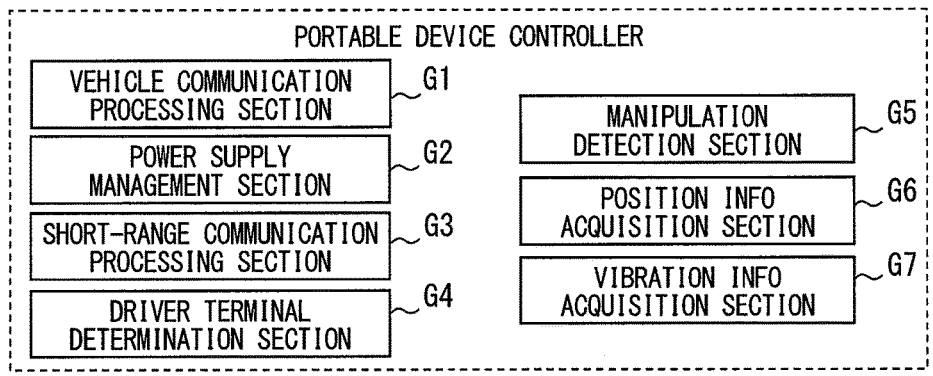
FIG. 6 is a block diagram illustrating a schematic configuration of a portable device controller.

The portable device controller 210 performs the above-mentioned program to implement function blocks such as a vehicle communication processing section G1, a power supply management section G2, a short-range communication processing section G3, a driver terminal determination section G4, a manipulation detection section G5, a position information acquisition section G6, and a vibration information acquisition section G7 as illustrated in FIG. 6.

The vehicle communication processing section G1 acquires data received by the LF receiver 222 via the LF antenna unit 221 and the reception signal strength of the data. The vehicle communication processing section G1 generates a signal to be transmitted from the UHF antenna unit 224 and outputs the signal to the UHF transmitter 223. Namely, the vehicle communication processing section G1 performs a software process related to communication with the in-vehicle apparatus 100.

A signal to be transmitted from the UHF antenna unit 224 signifies a response signal corresponding to a signal received from the in-vehicle apparatus 100. When a verification signal is received, for example, an ID code is generated from the contents of the received data and the portable device ID based on a predetermined rule. A signal including the ID code is returned. When a positioning signal is received, a response signal is returned which includes signal strength information indicating the reception signal strength of the positioning signal.

The power supply management section G2 controls electric power supply to the components from a power supply (unshown) included in the vehicular portable device 200. The power supply management section G2 sets the short-range communicator 230 to a low power consumption mode in order to save power consumption in the short-range communicator 230 when there is no need for short-range communication with the mobile terminal 300, for example. The low power consumption mode may stop supplying the electric power to the whole of the short-range communicator 230 or may save the power consumption by supplying the electric power to limited portions.

There is no need for short-range communication with the mobile terminal 300 when no instruction signal is received from the in-vehicle apparatus 100 or when a scan process to be described detects no mobile terminal 300 in the vicinity of the self unit. An active mode signifies a mode that differs from the low power consumption mode and enables short-range communication with the mobile terminal 300, for an illustrative purpose.

The vehicular portable device 200 uses a sleep mode and a wake mode as operation modes. The sleep mode saves the power consumption for the entire of the vehicular portable device 200. The wake mode permits relatively more portions supplied with the electric power than the sleep mode. Suppose the vehicular portable device 200 receives a signal (such as a wake signal) from the in-vehicle apparatus 100 in the sleep mode. In this case, the components related to the power supply management section G2 first start. The power supply management section G2 supplies the electric power to predetermined functional sections.

The short-range communication processing section G3 acquires data received by the short-range communication controller 232 via the short-range communication antenna unit 231 and the reception signal strength of the data. The short-range communication processing section G3 generates a signal to be transmitted from the mobile terminal 300 and outputs the signal to the short-range communication controller 232.

The short-range communication processing section G3 performs a process (scan process) to detect the mobile terminal 300 existing in the vicinity of the self unit as a preparatory process to communicate with the mobile terminal 300. The short-range communication processing section G3 performs the scan process to enable the short-range communicator 230 to receive signals from the mobile terminal 300 only during a time corresponding to the notification cycle, for example. The notification signal transmitted from the mobile terminal 300 is received within that time to detect the mobile terminal 300 existing in the vicinity of the self unit. The scan process may be configured to detect not only the mobile terminal 300, but also all communication terminals having the short-range communication that exist in the vicinity of the self unit.

The mobile terminal 300 detected by the scan process is associated with the reception signal strength of a signal from the mobile terminal and is managed in a list form, for example. The short-range communication processing section G3 allows the detected mobile terminal 300 to be distinguished by the terminal ID of the mobile terminal 300.

The short-range communication processing section G3 performs the scan process upon receipt of an instruction signal from the in-vehicle apparatus 100, for example. Obviously, in a modification, the scan process may be performed when the vehicular portable device 200 receives a signal from the in-vehicle apparatus 100 other than the instruction signal. In yet another modification, the scan process may be performed at a specified time interval while the vehicular portable device 200 enters the wake mode.

The driver terminal determination section G4 determines a mobile terminal (referred to as a driver terminal) estimated to be carried by the driver out of the multiple mobile terminals 300 existing in the vicinity of the self unit, based on the reception signal strength of a signal transmitted from each of the mobile terminals 300. Specifically, the driver terminal determination section G4 determines a driver terminal out of the multiple mobile terminals 300 existing in the vicinity of the self unit when the mobile terminal 300 estimated to be the driver terminal transmits a signal of the greatest reception signal strength during a time period determined by a reference time point being a time point at which the instruction signal is received.

Suppose only one mobile terminal 300 exists in the vicinity of the self unit and the reception signal strength from the mobile terminal 300 is greater than or equal to a predetermined threshold value. In this case, that mobile terminal 300 can be determined as the driver terminal. The threshold value here is used to determine whether a distance between the vehicular portable device 200 and the detected mobile terminal 300 is longer than or equal to a predetermined value (e.g., 5 m).

Suppose the driver terminal determination section G4 determines the driver terminal. The vehicle communication processing section G1 then transmits the terminal ID of the driver terminal as the driver information to the in-vehicle apparatus 100.

The manipulation detection section G5 detects user manipulation on the switch 240 based on a control signal input from the switch 240. Suppose the manipulation detection section G5 detects that the user pushes the switch 240 to unlock the door of vehicle V. The vehicle communication processing section G1 then transmits a signal to instruct unlocking of the door to the in-vehicle apparatus 100. The position information acquisition section G6 acquires the position information supplied from the GNSS receiver 260. The vibration information acquisition section G7 acquires information about a vibration occurring on the vehicular portable device 200, the information being supplied from the vibration sensor 250.

<Configuration of the Mobile Terminal 300>

Figure 7:
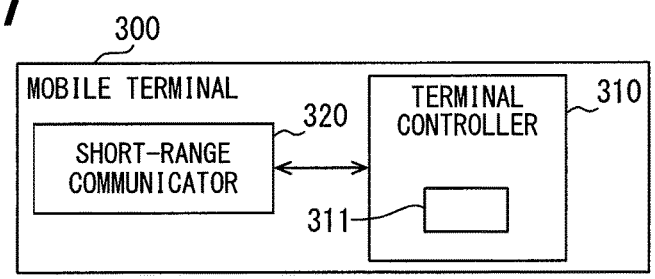
FIG. 7 is a block diagram illustrating a schematic configuration of a mobile terminal.

As above, the mobile terminal 300 just needs to have a function to perform the short-range communication and can use various mobile terminals such as a smartphone. FIG. 7 illustrates a schematic configuration of the mobile terminal 300. As illustrated in FIG. 7, the mobile terminal 300 includes a terminal controller 310 and a short-range communicator 320. The following omits a configuration that concerns functions of general mobile terminals such as a smartphones but is unnecessary for the description of the embodiment.

The terminal controller 310 is mainly configured as a microcomputer including a CPU, ROM, flash memory, RAM, and an I/O unit and performs various processes by executing a control program stored in the ROM. All or part of the functions performed by the terminal controller 310 may be configured as hardware by using one or more IC modules.

A storage unit 311 included in the terminal controller 310 is provided as a non-volatile storage medium such as flash memory. The storage unit 311 stores various application programs in addition to the terminal ID unique to the mobile terminal 300. The storage unit 311 stores an application program for communicating with the in-vehicle apparatus 100 via the vehicular portable device 200, for example.

The short-range communicator 320 provides a module to implement functions for the mobile terminal 300 to perform the short-range communication with the vehicular portable device 200. The short-range communicator 320 is configured similarly to the short-range communicator 230.

<Driver Specification Process>

The description below explains processes performed by the vehicle controller 101 of the in-vehicle apparatus 100 and the portable device controller 210 of the vehicular portable device 200 to specify a driver. The process performed by the vehicle controller 101 of the in-vehicle apparatus 100 is referred to as an in-vehicle apparatus process and the process performed by the portable device controller 210 of the vehicular portable device 200 is referred to as a portable device process, for convenience sake. The in-vehicle apparatus process and the portable device process are generically referred to as a driver specification process.

Figure 8:
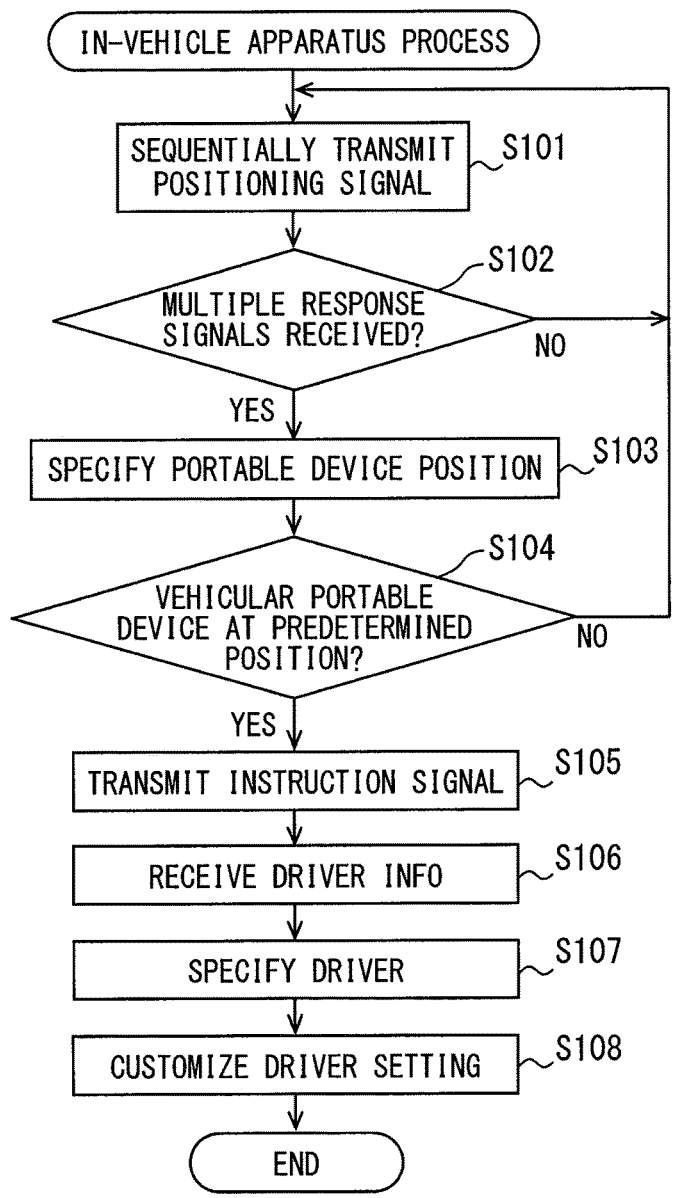
FIG. 8 is a flowchart illustrating an in-vehicle apparatus process performed by the vehicle controller.

The in-vehicle apparatus process is first described with reference to a flowchart in FIG. 8. The in-vehicle apparatus process starts at a time point when the verification is successful based on wireless communication between the in-vehicle apparatus 100 and the vehicular portable device 200, for example.

Obviously, a condition to start the in-vehicle apparatus process may be appropriately designed. The condition may be satisfied when detecting an entry of the vehicular portable device 200 into the vehicle communication range. A condition to start a portable device process to be described may be also appropriately designed. In the example below, it is assumed that the condition is satisfied when the verification is successful based on wireless communication between the in-vehicle apparatus 100 and the vehicular portable device 200 similarly to the in-vehicle apparatus process.

At step S101, the transmission processing section F1 causes each LF antenna unit 104 to transmit a positioning signal and proceeds to step S102. The positioning signal just needs to request a response from the vehicular portable device 200 and may use a wake signal. Obviously, the positioning signal may only specify the position of the vehicular portable device 200.

At step S102, the reception processing section F2 determines whether response signals are received as response to three or more positioning signals sequentially transmitted from the LF antenna units 104 at step S101.

Step S102 results in YES and control proceeds to step S103 if response signals are received as response to three or more positioning signals sequentially transmitted from the LF antenna units 104. Step S102 results in NO and control returns to step S101 if response signals are received as response to two or less positioning signals sequentially transmitted from the LF antenna units 104.

There may be a case of determining that no response signal is received as response to the positioning signal transmitted from the LF antenna unit 104. The case signifies that no response signal is received from the vehicular portable device 200 within a predetermined response wait time elapsed from transmission of the positioning signal. There may be a case of determining that a response signal is received in response to the positioning signal transmitted from the LF antenna unit 104. The case signifies that a response signal is received from the vehicular portable device 200 within a predetermined response wait time elapsed from transmission of the positioning signal. The response wait time here may be appropriately designed in accordance with the time needed for the vehicular portable device 200 to return a response signal in response to a signal transmitted from the in-vehicle apparatus 100.

When control returns to step S101, the process performs step S101 after a predetermined time elapsed from completion of step S101. Namely, the in-vehicle apparatus 100 transmits the positioning signal at a predetermined transmission cycle.

At step S103, the portable device position specification section F5 uses the above-mentioned method to specify a portable device position from reception signal strengths indicated by multiple response signals and proceeds to step S104. At step S104, the process determines whether the portable device position exists in an identification area.

With reference to FIGS. 1, and 9 through 11, the description below explains a relation between: a distance between the user undertaking a role as a driver and the other users; and the reception signal strength in the vehicular portable device 200, namely, the reception signal strength of a signal transmitted from each of the mobile terminals 300 carried by the users. Generally, the driver carries the vehicular portable device 200 having the function as a key for vehicle V. User Ua carrying the vehicular portable device 200 can be considered to be the user undertaking a role as a driver.

As illustrated in FIG. 1, user Ua (i.e., driver) carrying the vehicular portable device 200 is relatively distant from user Ub. In this case, the mobile terminal 300a is placed at a position nearer to the vehicular portable device 200 than the mobile terminal 300b. The reception signal strength of a signal transmitted from the mobile terminal 300 decreases in the vehicular portable device 200 as a distance between the vehicular portable device 200 and the mobile terminal 300 as a transmission source of the signal increases.

Figure 9:
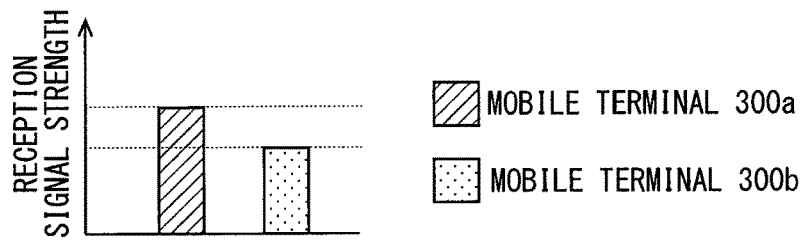
FIG. 9 is a conceptual diagram illustrating the magnitude relation between reception signal strengths of signals received by the vehicular portable device from mobile terminals of users Ua and Ub distant from each other.

As illustrated in FIG. 9, the vehicular portable device 200 receives a signal from the mobile terminal 300a, the reception signal strength of the received signal being greater than the reception signal strength of a signal from the mobile terminal 300b when user Ua carrying the vehicular portable device 200 is relatively distant from user Ub.

Figure 10:
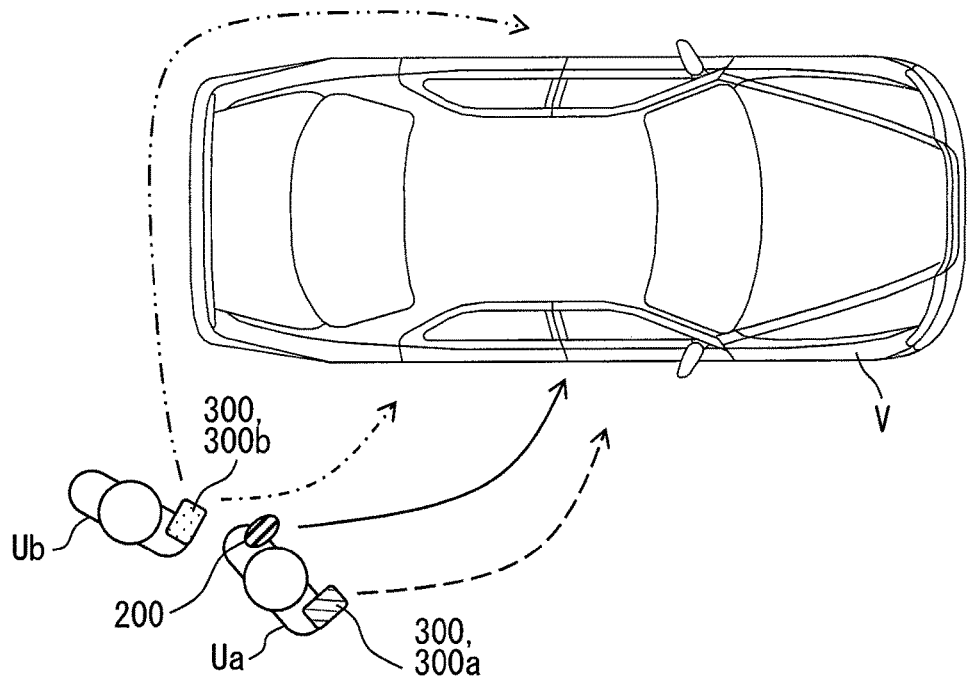
FIG. 10 is a conceptual diagram illustrating a situation where users Ua and Ub are closed to each other.

As illustrated in FIG. 10, users Ua and Ub exist at relatively close positions. In this case, the mobile terminals 300a and 300b exist at relatively close positions from the vehicular portable device 200. A relatively small difference is then found between the attenuation corresponding to a propagation distance traveled by a signal transmitted from the mobile terminal 300a to the vehicular portable device 200 and the attenuation corresponding to a propagation distance traveled by a signal transmitted from the mobile terminal 300b to the vehicular portable device 200.

The propagation distance is not the only factor to attenuate the signal strength of a signal transmitted from the mobile terminal 300a. Suppose user Ua carries the vehicular portable device 200 and the mobile terminal 300 so that the body of user Ua intervenes between the vehicular portable device 200 and the mobile terminal 300. In this case, a signal transmitted from the mobile terminal 300a may attenuate due to an effect of the body of user Ua.

Figure 11:
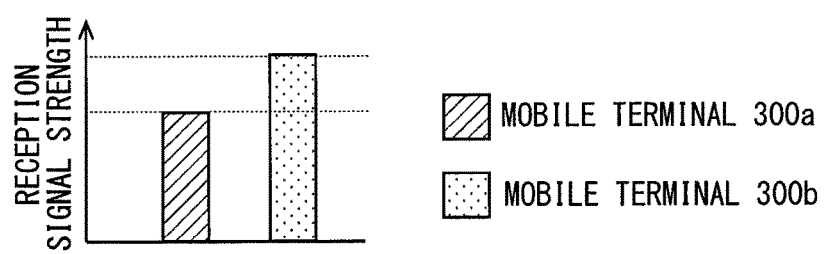
FIG. 11 is a conceptual diagram illustrating the magnitude relation between reception signal strengths of signals received by the vehicular portable device from mobile terminals of users Ua and Ub close to each other.

As illustrated in FIG. 11, the reception signal strength of a signal transmitted from the mobile terminal 300b to the vehicular portable device 200 is consequently greater than the reception signal strength of a signal transmitted from the mobile terminal 300a when users Ua and Ub exist at relatively close positions. Namely, for the vehicular portable device 200, the mobile terminal 300 with the greatest reception signal strength is not always a mobile terminal carried by the user undertaking a role as a driver.

Users Ua and Ub may be close to each other when the vehicular portable device 200 is distant from vehicle V. However, suppose the vehicular portable device 200 exists near the door for the driver's seat. In this case, user Ub (mobile terminal 300b) and user Ua (mobile terminal 300a) are less likely to exist closely enough so that the reception signal strength of the mobile terminal 300b is greater than the reception signal strength of the mobile terminal 300a.

This is because user Ua is going to enter the vehicle from the door for the driver's seat while user Ub is going to enter the vehicle from another door. In FIG. 10, multiple arrows in different types of lines conceptually illustrate an example of transfer pathways for the vehicular portable device 200, the mobile terminal 300a, and the mobile terminal 300b. Specifically, the arrowed solid line in FIG. 10 represents the transfer pathway for the vehicular portable device 200. The broken line represents the transfer pathway for the mobile terminal 300a. The dot-and-dash line in FIG. 10 represents an example of the transfer pathway for the mobile terminal 300b when user Ub is going to enter the rear seat corresponding to the driver's seat. The two-dot chain line represents an example of the transfer pathway when user Ub is going to enter the passenger seat.

As illustrated in FIG. 10, separation between users Ua and Ub is ensured as user Ua approaches the vehicle. The reception signal strength for the mobile terminal 300b is less likely to be greater than the reception signal strength for the mobile terminal 300a.

In consideration of the foregoing, the identification area is expected so as to allow the vehicular portable device 200 to recognize the reception signal strength for the mobile terminal 300 carried by user Ua to be greater than reception signal strengths for the mobile terminals 300 carried by other users.

For example, the identification area is within a predetermined distance (e.g., 50 cm) from the door handle for the driver's seat outside the vehicle compartment. Obviously, the identification area is not limited to being available within a predetermined distance from the door handle for the driver's seat outside the vehicle compartment. The identification area may cover a predetermined range in vehicle compartment with reference to the driver's seat, for example. A boundary between the outside of the vehicle compartment and the inside thereof near the driver's seat may be adopted as the identification area.

Returning to FIGS. 8, the description of the in-vehicle apparatus process will continue. Step S104 results in YES and control proceeds to step S105 if the vehicular portable device 200 exists in the identification area at step S104. Step S104 results in NO and the process returns to step S101 if the vehicular portable device 200 does not exists in the identification area.

At step S105, the transmission processing section F1 causes the specified LF antenna unit 104 to transmit an instruction signal and proceeds to step S106. An instruction signal may be sequentially output from all the LF antenna units 104. An instruction signal may be output from the LF antenna unit 104 that transmits the positioning signal at step S102 to receive a response signal.

At step S106, the process receives driver information transmitted from the vehicular portable device 200 and proceeds to step S107. At step S107, the process specifies a user undertaking a role as a driver based on the terminal ID as the driver information and the user management data stored in the storage unit 101M. Namely, the process references the user management data and recognizes the user as a driver when the user is associated with the terminal ID as the driver information.

At step S108, the driver setting customization section F7 changes the setting such as the interior environment of vehicle V to an environment suited for the preference of the driver specified at step S107 and terminates the process flow.

Figure 12:
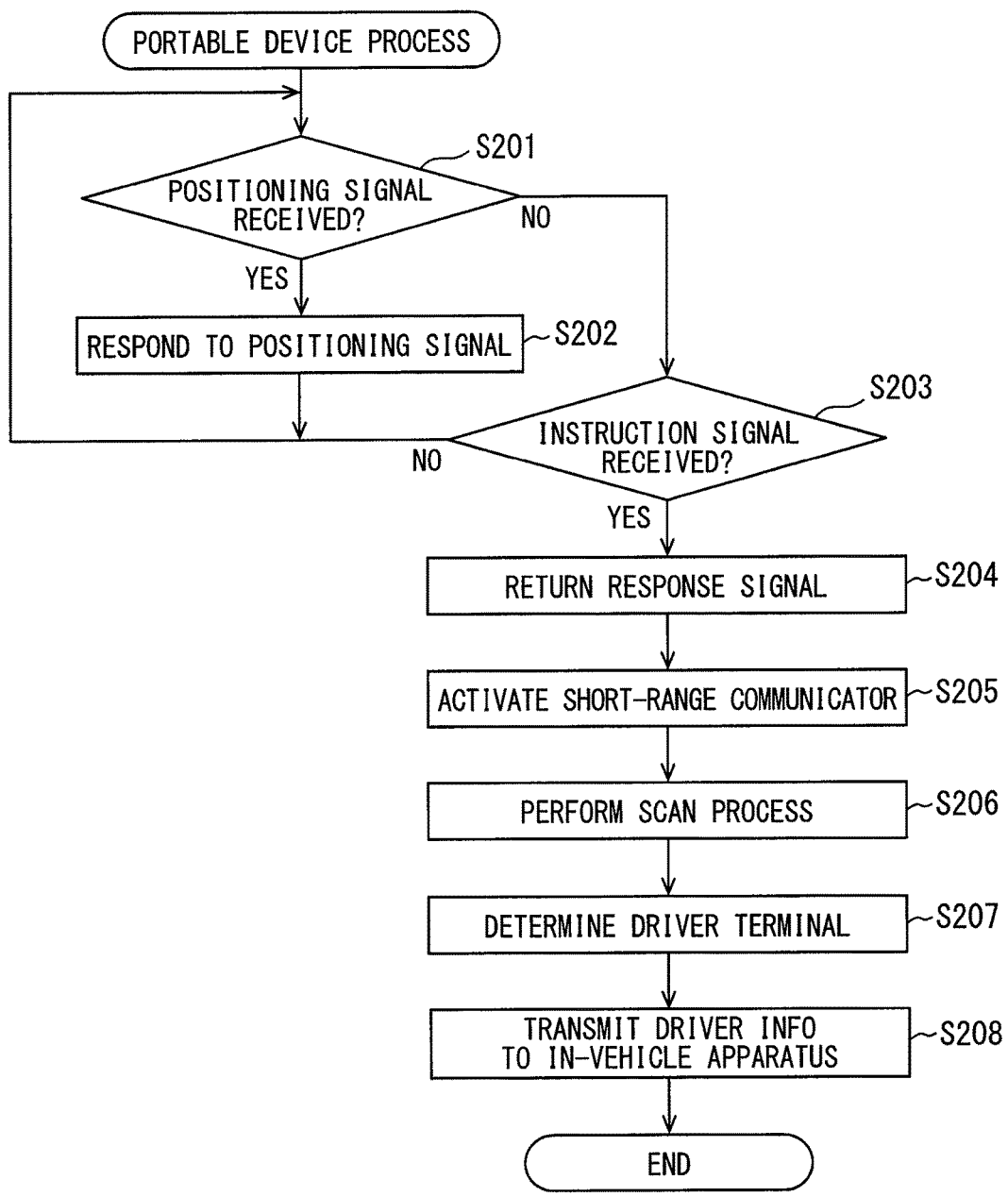
FIG. 12 is a flowchart illustrating a portable device process performed by the portable device controller.

The portable device process will be described with reference to a flowchart in FIG. 12. It is assumed that at the time point of start of the process flow, the short-range communicator 230 is in the low power consumption mode.

At step S201, the vehicle communication processing section G1 determines whether a positioning signal is received. Step S201 results in YES and control proceeds to step S202 if a positioning signal is received. Step S201 results in NO and control proceeds to step S203 if no positioning signal is received.

At step S202, the process returns a response signal as response to the positioning signal received at step S202 and returns to step S201. The response signal includes the signal strength information indicating the reception signal strength of the positioning signal.

At step S203, the process determines whether an instruction signal is received. Step S203 results in YES and control proceeds to step S204 if an instruction signal is received. Step S203 results in NO and control returns to step S201 if no instruction signal is received.

The number of positioning signals to be transmitted equals the number of LF antenna units 104 included in the in-vehicle apparatus 100. The process may therefore receive a positioning signal transmitted from another LF antenna unit 104 after returning the positioning signal as a response at step S202. Performing steps S201 and 202 in succession signifies sequentially receiving positioning signals transmitted from the multiple LF antenna units 104.

Step S201 results in NO and step S203 results in YES and control proceeds to step S204 if an instruction signal is transmitted from the in-vehicle apparatus 100. Steps S201 and 203 are determined to be NO and the process flow repeats at S201 and S203 if neither positioning signal nor instruction signal is received.

At step S204, the vehicle communication processing section G1 returns a response signal indicating successful reception of the instruction signal and proceeds to step S205. At step S205, the power supply management section G2 transitions the short-range communicator 230 from the low power consumption mode to the active mode and proceeds to step S206.

At step S206, the short-range communication processing section G3 performs a scan process to detect the mobile terminal 300 existing in the vicinity of the self unit and the reception signal strength of the mobile terminal 300. The process proceeds to step S207 on completion of step S206.

At step S207, the process determines a driver terminal, namely, the mobile terminal 300 detected to transmit a signal indicating the greatest reception signal strength as a result of the scan process at step S206 and proceeds to step S208. At step S208, the vehicle communication processing section G1 transmits a response signal to the in-vehicle apparatus 100 and terminates the process flow. The response signal includes the driver information, namely, the terminal ID of the mobile terminal 300 corresponding to the driver terminal determined at step S207.

<Compiling of the Present Embodiment>

With the above-mentioned configuration, the in-vehicle apparatus 100 successively detects positions of the vehicular portable device 200 with reference to vehicle V and determines that the vehicular portable device 200 exists in a predetermined identification area. The in-vehicle apparatus 100 then transmits an instruction signal instructing the vehicular portable device 200 to identify the driver terminal.

The vehicular portable device 200 receives the instruction signal from the in-vehicle apparatus 100 and performs the scan process. The vehicular portable device 200 detects the mobile terminal 300 existing in the vicinity of the self unit and acquires the reception signal strength of a signal transmitted from each of the mobile terminals 300. The vehicular portable device 200 determines the driver terminal, namely, the mobile terminal 300 detected to indicate the greatest reception signal strength as a result of the scan process and returns the corresponding terminal ID to the in-vehicle apparatus 100.

The vehicular portable device 200 performs the scan process when the instruction signal is received and therefore when the vehicular portable device 200 exists in the identification area. As above, the identification area is an area where it is expected that the reception signal strength for the mobile terminal 300 carried by the driver is greater than reception signal strengths for the mobile terminals 300 carried by users other than the driver.

The mobile terminal 300 indicating the greatest reception signal strength as a result of the above-mentioned process is highly likely to be the driver terminal. The above-mentioned configuration can therefore inhibit a possibility of incorrectly identifying the mobile terminal carried by a user other than the driver as the mobile terminal carried by the driver.

Namely, the mobile terminal carried by the driver can be accurately identified and the driver can be therefore accurately identified.

While the embodiment has been illustrated, the embodiment is not limited to the above-mentioned and can be modified in various ways including modifications described below.

<First Modification>

The above vehicular portable device transmits the terminal ID unique to the mobile terminal 300 as the driver information. However, this is not limiting. The vehicular portable device 200 may specify a user undertaking a role as a driver from the terminal ID as the driver information and may transmit information (e.g., user ID) representing the user as the driver information to the in-vehicle apparatus 100. Namely, the vehicular portable device 200 may include the function corresponding to the driver specification section F6. A user ID found from the terminal ID of the driver terminal also corresponds to an example of the driver-terminal-related information.

The first modification can be embodied by allowing the portable device storage unit 211 of the vehicular portable device 200 to previously store data (referred to as terminal management data) resulting from associating the user ID of each user for vehicle V with the terminal ID of the mobile terminal 300 owned by the user, for example. In this configuration, the vehicular portable device 200 determines the driver terminal, then references the terminal management data, and determines a driver, namely, the user associated with the terminal ID of the mobile terminal 300 identified as the driver terminal. The vehicular portable device 200 transmits the user ID of a user conforming to the driver to the in-vehicle apparatus 100. The user ID is transmitted as the driver information. This configuration also provides an effect similar to the above-mentioned embodiment.

<Second Modification>

In the above-mentioned embodiment, the storage unit 101M of the in-vehicle apparatus 100 stores the vehicle setup data for each user as the user management data and the driver setting customization section F7 instructs each ECU (e.g., the body ECU 110) and the electric equipment (e.g., navigation system) that the vehicle setting conforms to the vehicle setup data for the driver. However, this is not limiting.

Each ECU may store the vehicle setting for each user in a range related to the ECU and the in-vehicle apparatus 100 may notify each ECU of the user ID for the user undertaking a role as a driver. Each ECU may read the vehicle setting corresponding to the user ID notified from the in-vehicle apparatus 100 and may change the setting.

This can also automatically change the setting of vehicle V to a setting conforming to the driver preference.

<Third Modification>

In the above, the transmission processing section F1 transmits an instruction signal when the portable device position is determined to be located in the identification area. However, this is not limiting. The transmission processing section F1 may further determine whether a predetermined situation (referred to as an identification status) occurs, based on the vehicle information acquired by the vehicle information acquisition section F3 when the portable device position is located in the identification area. An instruction signal may be transmitted when the identification status is determined to occur.

The identification status here is the status in which, for the vehicular portable device 200, the reception signal strength of a signal transmitted from the mobile terminal 300 carried by the driver is greater than the reception signal strength of a signal transmitted from the mobile terminal 300 carried by a user of the driver.

Specifically, an instruction signal is transmitted when the vehicular portable device 200 exists near the door for the driver's seat and a user's touch is detected on the touch sensor 106 provided for the door handle for the driver's seat.

An instruction signal may be transmitted when the vehicular portable device 200 exists near the door for the driver's seat and the door for the driver's seat is opened. Information to determine whether the door is opened can be acquired from the body ECU 110.

Figure 13:
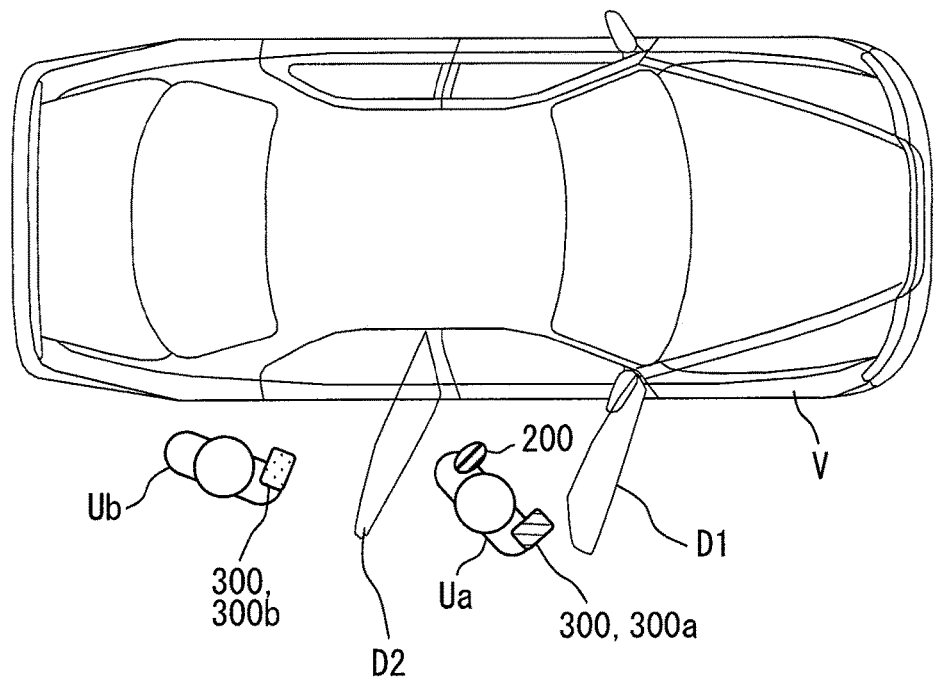
FIG. 13 is a conceptual diagram illustrating operation of a third modification.

As illustrated in FIG. 13, an instruction signal may be transmitted when the vehicular portable device 200 exists near the door for the driver's seat and door D1 for the driver's seat and door D2 for the rear seat corresponding to the driver's seat are opened.

Door D2 exists between user Ua and user Ub when door D1 for the driver's seat and door D2 for the rear seat corresponding to the driver's seat are opened. Namely, door D2 exists between the vehicular portable device 200 and the mobile terminal 300b.

It is therefore expected that door D2 attenuates and decreases the reception signal strength of a signal that is transmitted from the mobile terminal 300b and is received by the vehicular portable device 200. Namely, the situation in FIG. 13 causes the reception signal strength of the mobile terminal 300a carried by user Ua more likely to be greater than the reception signal strength of the mobile terminal 300 carried by user Ub. Determining the driver terminal in this situation can more accurately specify the driver terminal.

The transmission processing section F1 may transmit an instruction signal when the vehicular portable device 200 exists near the driver's seat in the vehicle compartment and a user is seated on the driver's seat. Whether the user is seated on the driver's seat can be determined based on information the vehicle information acquisition section F3 acquires from the body ECU 110.

A user seated on the driver's seat signifies the driver. The driver is expected to sit on the driver's seat while wearing the vehicular portable device 200 because the vehicular portable device 200 exists near the driver's seat. In this situation, for the vehicular portable device 200, the reception signal strength of the mobile terminal 300a is more likely greater than the reception signal strength of the mobile terminal 300b because this situation ensures a distance between the driver and the other users. Determining the driver terminal in this situation can therefore more accurately specify the driver terminal.

The transmission processing section F1 may transmit an instruction signal when the vehicular portable device 200 exists near the driver's seat in the vehicle compartment and the engine start button 107 is pushed. Also in this case, for the vehicular portable device 200, the reception signal strength of the mobile terminal 300a is more likely greater than the reception signal strength of the mobile terminal 300b. The driver terminal can be more accurately specified.

<Fourth Modification>

In the above illustration, the scan process is performed after reception of an instruction signal to acquire the information (i.e., the reception signal strength of each mobile terminal 300) used to determine the driver terminal. However, this is not limiting. The short-range communicator 230 may be transitioned to the active mode from the time point of receipt the positioning signal and the scan process may be periodically performed before an instruction signal is received.

This can specify the driver terminal based on a result of the scan process performed immediately before reception of an instruction signal and can more promptly respond to reception of the instruction signal.

<Fifth Modification>

In the above illustration, the driver terminal is determined based on a result of the one-time scan process. However, this is not limiting. The scan process may be performed more than once from the time point of receipt of the instruction signal and the driver terminal may be determined based on results of the multiple scan processes.

The driver terminal may be determined to be the mobile terminal 300 that is most often determined to indicate the greatest reception signal strength as results of multiple scan processes. Average values of the reception signal strength may be calculated for each of the mobile terminals 300 from results of multiple scan processes and the driver terminal may be determined to be the mobile terminal 300 that indicates the highest average value. The driver terminal may be further determined to be the mobile terminal 300 that indicates the highest median instead of the average value.

The scan process is performed at a predetermined time interval. This fifth modification therefore corresponds to determining the driver terminal based on the reception signal strength of a signal received from the mobile terminal 300 from the time point of receipt of an instruction signal until a lapse of the time needed to perform the scan process for the predetermined number of times.

The configuration of the fifth modification can reduce an effect of momentary disturbance and can therefore accurately determine the driver terminal.

<Sixth Modification>

As described in the fourth modification, an application of the fifth modification may determine the driver terminal based on results of the predetermined number of scan processes performed immediately before reception of an instruction signal when the scan process is periodically performed before the instruction signal is received. Namely, the driver terminal may be determined based on a result of the scan process performed from a predetermined time point earlier than the time point of receipt of an instruction signal until reception of the instruction signal.

The sixth modification uses the same method as the fifth modification to determine the driver terminal from results of multiple scan processes. The sixth modification differs from the fifth modification in the time period to collect the reception signal strength from each of the mobile terminals 300 in order to use the reception signal strength to determine the driver terminal.

The configuration of the sixth modification can more promptly return the driver information to the in-vehicle apparatus 100 in response to reception of an instruction signal similarly to the fourth modification. The configuration specifies the driver terminal from results of multiple scan processes similarly to the fifth modification and can therefore reduce an effect of momentary disturbance and more accurately determine the driver terminal.

<Seventh Modification>

The fifth modification and the sixth modification may be combined to determine the driver terminal based on results of multiple scan processes performed during a predetermined time period before and after the time point of receipt of an instruction signal.

<Eighth Modification>

The transmission processing section F1 may transmit an instruction signal more than once after the vehicular portable device 200 enters the vehicle communication range until the engine starts. Namely, the identification area may be provided at multiple locations.

Three identification areas may be defined near the door for the driver's seat outside the vehicle compartment, at a boundary between the inside and the outside of the vehicle compartment near the door for the driver's seat, and near the driver's seat in the vehicle compartment, for example. An instruction signal may be transmitted each time the portable device position specification section F5 determines that the vehicular portable device 200 exists in each of the identification areas.

An instruction signal may be transmitted more than once after the vehicular portable device 200 enters the vehicle communication range until the engine starts, in the configuration that determines whether an instruction signal is transmitted depending on a combination of the portable device position and the vehicle state as illustrated in the third modification.

It is favorable to specify a driver as early as possible because the in-vehicle apparatus 100 can increase types of services available for the driver. It is favorable to automatically adjust the seat position before the driver sits on the driver's seat, for example. Namely, in the configuration that specifies the driver at the time to start the engine, the service such as automatically adjusting the seat position cannot easily use a result of specifying the driver.

An approach to an event such as starting the engine is expected to increase the accuracy in specifying the driver. The driver is likely to be close to other users when the vehicular portable device 200 exists outside the vehicle compartment. However, the driver can ensure a surrounding separation corresponding to a distance between the driver's seat and the other seat when the engine starts.

The eighth modification specifies the driver terminal (and the driver) more than once by transmitting an instruction signal at multiple stages. The in-vehicle apparatus 100 can use a specification result acquired at an appropriate stage depending on the contents of a service provided for the driver. Namely, the in-vehicle apparatus 100 provides a service to be provided at a relatively early stage based on a specification result at an initial stage. Contrastingly, the in-vehicle apparatus 100 provides a service that can be provided at a relatively late stage (immediately before starting engine or later) based on a more accurate specification result acquired at the time to start the engine, for example. The service here signifies tailoring the interior environment to meet the driver preference, for example.

<Ninth Modification>

The vehicular portable device 200 may perform the scan process to specify the driver terminal when the manipulation detection section G5 detects that the user pushes the switch 240. For example, the vehicular portable device 200 may perform the scan process to specify the driver terminal when the manipulation detection section G5 detects that the user pushes the switch 240 to lock the door of vehicle V. The vehicular portable device 200 may include the switch 240 to instruct determination of the driver terminal. In such a case, the vehicular portable device 200 may perform the scan process to specify the driver terminal upon detection of the push manipulation on the switch 240.

In this configuration, the driver can manipulate and allow the vehicular portable device 200 to perform a process to specify the driver even if the in-vehicle apparatus 100 cannot normally specify the portable device position and cannot automatically specify the driver.

<Tenth Modification>

The vehicular portable device 200 may allow the portable device storage unit 211 to store a parking position of vehicle V, for example, and may start a process (such as the scan process) to specify the driver terminal when the self unit is placed within a predetermined distance from the parking position. The parking position may correspond to a position acquired by the position information acquisition section G6 when the verification signal is received most recently, for example. The portable device controller 210 stores the position information as the parking position in the portable device storage unit 211.

The vehicular portable device 200 may detect that the self unit separates from vehicle V (to exceed a predetermined distance) based on the position information acquired by the position information acquisition section G6. In this case, the vehicular portable device 200 maintains a condition of being separated as an internal state. The vehicular portable device 200 later starts the process to specify the driver terminal when the condition of being separated changes to resume the predetermined distance between the parking position and the self unit.

This can periodically perform the scan process before the vehicular portable device 200 enters the vehicle communication range. The driver information can be more promptly returned to the in-vehicle apparatus 100 in response to reception of an instruction signal similarly to the fourth modification. The tenth modification is especially useful when the vehicle communication range is set to be very narrow.

<Eleventh Modification>

The vehicular portable device 200 may transmit passenger information about a passenger other than the driver in addition to the driver information. Specifically, when the vehicular portable device 200 determines the driver terminal, the vehicular portable device 200 transmits the passenger information to the in-vehicle apparatus 100. The passenger information is the terminal ID of the mobile terminal 300 that exists in the vicinity of the self unit and differs from the driver terminal.

Obviously, a user ID instead of a terminal ID may be transmitted as the passenger information when the portable device storage unit 211 stores the terminal management data as described in the first modification. In this case, the user ID corresponding to the terminal ID of the mobile terminal 300 that exists in the vicinity of the self unit and differs from the driver terminal. The passenger information corresponds to non-driver-terminal-related information.

This enables the in-vehicle apparatus 100 to acquire also information about an occupant other than the driver. The in-vehicle apparatus 100 can change the vehicle setting based on the information about the non-driver occupant. The in-vehicle apparatus 100 can adjust seat positions or select an air outlet to discharge the air from an air conditioner. This configuration may discharge the air to the passenger seat and the rear seat from the air conditioner when there are multiple users as occupants other than the driver.

What is claimed is:

1. A user identification system comprising:
   an in-vehicle apparatus mounted to a vehicle used by a plurality of users including a user who undertakes a role as a driver; and
   a vehicular portable device that is carried by the driver, and that is associated with the in-vehicle apparatus, the in-vehicle apparatus includes:
- an in-vehicle apparatus communicator that communicates with the vehicular portable device; and
- a portable device position specification section that specifies a position of the vehicular portable device with reference to the vehicle and determines whether the vehicular portable device exists in a predetermined identification area, the vehicular portable device includes:
- a first communicator that communicates with the in-vehicle apparatus;
- a second communicator that performs short range communication with a mobile terminal carried by the user;
- a reception signal strength detector that detects reception signal strength of a signal that the second communicator receives from the mobile terminal; and
- a driver terminal determination section that determines, based on the reception signal strength detected by the reception signal strength detector, a driver terminal which is the mobile terminal carried by the user undertaking the role as the driver, and wherein:
the in-vehicle apparatus communicator transmits an instruction signal to the vehicular portable device as an instruction to perform a process to determine the driver terminal, based on determining, by the portable device position specification section, that the vehicular portable device exists in the predetermined identification area;

the first communicator receives the instruction signal transmitted from the in-vehicle apparatus;

the driver terminal determination section determines the driver terminal, based on the reception signal strength detected by the reception signal strength detector during a time period determined by a reference time point, the reference time point being a time point when the first communicator receives the instruction signal; and the predetermined identification area is an area in which there is a high possibility for the vehicular portable device that the reception signal strength of the signal transmitted from the mobile terminal carried by the user undertaking the role as the driver is greater than the reception signal strength of the signal transmitted from the mobile terminal carried by the user other than the driver.

2. The user identification system according to claim 1, wherein:
the vehicular portable device identifies the mobile terminal existing around the vehicular portable device based on an identification code which is included in the signal transmitted from the mobile terminal and which is unique to the mobile terminal; and when the plurality of mobile terminals exist around the vehicular portable device at the time point of receipt of the instruction signal, the driver terminal determination section determines that the driver terminal is the mobile terminal that transmits the signal indicating the greatest reception signal strength during the time period.

3. The user identification system according to claim 1, wherein:
the vehicular portable device identifies the mobile terminal existing around the vehicular portable device based on an identification code which is included in the signal transmitted from the mobile terminal and which is unique to the mobile terminal; and when the plurality of mobile terminals exist around the vehicular portable device at a time point of receipt of the instruction signal, the reception signal strength detector detects the reception signal strength of a signal from each of the mobile terminals during the time period multiple times and the driver terminal determination section determines one of the plurality of mobile terminals as the driver terminal based on the reception signal strength detected the multiple times.

4. The user identification system according to claim 1, wherein:
the in-vehicle apparatus includes a vehicle information acquisition section that acquires vehicle information indicating a state of the vehicle;

when the portable device position specification section determines that the vehicular portable device exists in the predetermined identification area, the in-vehicle apparatus communicator determines, from the vehicle information acquired by the vehicle information acquisition section, whether a predetermined identification status is present for the vehicular portable device in which it is expected that the reception signal strength of the signal transmitted from the mobile terminal carried by the user undertaking the role as the driver is greater than the reception signal strength of a signal transmitted from the mobile terminal carried by the other user; and the in-vehicle apparatus communicator transmits the instruction signal when it is determined that the identification status is present according to a result of the determining.

5. The user identification system according to claim 4, wherein:
a plurality of the identification statuses are settled during a period from when the in-vehicle apparatus starts receiving a signal from the vehicular portable device until an engine included in the vehicle starts;

the in-vehicle apparatus communicator transmits the instruction signal each time it is determined, from the vehicle information acquired by the vehicle information acquisition section, that the identification status is present; and the driver terminal determination section determines the driver terminal each time the first communicator receives the instruction signal.

6. The user identification system according to claim 1, wherein:
the vehicular portable device includes a switch to be manipulated by the user; and the driver terminal determination section determines the driver terminal based on the reception signal strength detected by the reception signal strength detector during a time period determined by a time point of the user's manipulation of the switch.

7. The user identification system according to claim 6, wherein:
the vehicular portable device includes a position information acquisition section that acquires position information indicating a current position of the vehicular portable device based on a radio wave transmitted from a positioning satellite;

the vehicular portable device stores a parking position of the vehicle, the parking position being the position information acquired by the position information acquisition section at a time point when the first communicator receives the signal from the in-vehicle apparatus;

the reception signal strength detector detects the reception signal strength of the signal from the mobile terminal when a distance between the parking position and the vehicular portable device comes to be longer than or equal to a predetermined distance and then the distance between the vehicular portable device and the parking position comes to be shorter than the predetermined distance; and the driver terminal determination section specifies the driver terminal based on the reception signal strength detected by the reception signal strength detector.

8. The user identification system according to claim 1, wherein:

the first communicator transmits driver-terminal-related information to the in-vehicle apparatus, the driver-terminal-related information corresponding to the driver terminal determined by the driver terminal determination section.

9. The user identification system according to claim 8, wherein:

the in-vehicle apparatus communicator receives the driver-terminal-related information; and the in-vehicle apparatus includes a driver specification section that specifies the user undertaking the role as the driver based on the driver-terminal-related information received by the in-vehicle apparatus communicator.

10. The user identification system according to claim 8, wherein:

the first communicator transmits non-driver-terminal-related information to the in-vehicle apparatus, the non-driver-terminal-related information corresponding to the mobile terminal that exists around the vehicular portable device and differs from the driver terminal;

the in-vehicle apparatus communicator receives the non-driver-terminal-related information; and the in-vehicle apparatus specifies a passenger who conforms to the user and differs from the driver for current traveling, based on the non-driver-terminal-related information received by the in-vehicle apparatus communicator.

11. The user identification system according to claim 8, wherein:

the vehicular portable device identifies the mobile terminal existing around the vehicular portable device based on an identification code that is included in a signal transmitted from the mobile terminal and is unique to the mobile terminal;

the vehicular portable device includes a portable device storage unit that stores data indicating correspondence relation between the identification code of the mobile terminal carried by each of the plurality of users and the user of the mobile terminal;

when the driver terminal determination section determines the driver terminal, the vehicular portable device references the data stored in the portable device storage unit and determines the user undertaking the role as the driver, the user being associated with the identification code of the driver terminal; and the first communicator transmits information about the determined user undertaking the role as the driver as the driver-terminal-related information to the in-vehicle apparatus.

12. A vehicular portable device associated with an in-vehicle apparatus mounted to a vehicle used by a plurality of users, the vehicular portable device comprising:

a first communicator that communicates with the in-vehicle apparatus;

a second communicator that performs short range communication with a mobile terminal carried by the user;

a reception signal strength detector that detects reception signal strength of a signal the second communicator receives from the mobile terminal; and a driver terminal determination section that determines a driver terminal based on the reception signal strength detected by the reception signal strength detector, the driver terminal being the mobile terminal carried by the user undertaking a role as a driver, wherein:

the first communicator receives an instruction signal that is transmitted from the in-vehicle apparatus as an instruction to perform a process to determine the driver terminal when the vehicular portable device exists in a predetermined identification area;

the driver terminal determination section determines the driver terminal based on the reception signal strength detected by the reception signal strength detector during a time period determined by a reference time point, the reference time point being a time point when the first communicator receives the instruction signal; and the predetermined identification area is an area in which there is a high possibility for the vehicular portable device that the reception signal strength of the signal transmitted from the mobile terminal carried by the user undertaking the role as the driver is greater than the reception signal strength of the signal transmitted from the mobile terminal carried by the user other than the driver.

* * * * *